United States Patent Office 3,439,022
Patented Apr. 15, 1969

3,439,022
METHYLENE-SUBSTITUTED-A-NORGONANES
Jean Jacques, Paris, France, assignor to Merck & Co., Inc.,
Rahway, N.J., a corporation of New Jersey
No Drawing. Filed Mar. 1, 1966, Ser. No. 530,772
Int. Cl. C07c 171/06
U.S. Cl. 260—488    1 Claim The present invention relates to novel A-nor-3-gonenes and A-nor-5α-gonanes, derivatives thereof and novel processes for preparing these compounds. More particularly, this invention relates to the 3-Mannich bases of 3-methyl - 10 - hydrogen or methyl-13-lower alkyl-17β-acyloxy-A-nor-5α-gonan - 2 - one and the 1-Mannich base of 1-methyl-10-hydrogen or methyl-13-lower alkyl-17α-acyloxy-A-nor-5α-gonan - 2 - one steroids; 3-methylene-, 3β - methyl- or 3α-methyl - 10 - hydrogen or methyl - 13 - lower alkyl - 17β - hydroxy or acyloxy-A-nor-5α-gonan - 2 - one steroids; 1-methylene- or 1β-methyl-10-hydrogen or methyl-13-lower alkyl - 17β - hydroxy or acyloxy-A-nor-5α-gonan - 2-one steroids; 3 - methyl - 10 - hydrogen or methyl-13-lower alkyl - 17β - hydroxy or acyloxy-A-nor-3-gonen-2-one steroids; 3α - methyl - 2β, 17β-dihydroxy-2α-alkyl, alkenyl or alkynyl - 10 - hydrogen or methyl-13-lower alkyl-A-nor-5α-gonane steroids; 1β-methyl - 2β,17β - dihydroxy - 2α - alkyl, alkenyl or alkynyl-10-hydrogen or methyl - 13 - lower alkyl - A - nor-5α-gonane steroids; the 1,3-double Mannich base of 1,3-dimethyl - 10-hydrogen or methyl - 13 - lower alkyl-17β-acyloxy-A-nor-5α-gonan-2-one steroids; 1,3 - dimethylene-10-hydrogen or methyl-13-lower alkyl - 17β - acyloxy-A-nor-5α-gonan-2-one steroids; 1β-methyl - 3 - methylene-10-hydrogen or methyl-13-lower alkyl - 17β - acyloxy-A-nor-3-gonen-2-one steroids; 1β,3α-dimethyl-10-hydrogen or methyl - 13 - lower alkyl-17β-acyloxy-A-nor-5α-gonan-2-one steroids; and methods for the preparation thereof.

The starting compound for the preparation of the novel compounds of this invention is a 10-hydrogen or methyl-13-lower alkyl - 17β - acyloxy - A - nor-5α-gonan-2-one steroid (Compound I), which has the following structural formula:

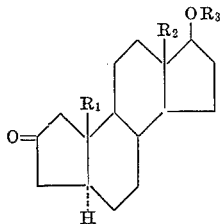

wherein $R_1$ is hydrogen or a methyl group; $R_2$ is a lower alkyl group, preferably having not more than five carbon atoms; and $R_3$ is an acyloxy group, preferably having not more than five carbon atoms.

The novel processes for the preparation of the novel compounds of this invention may be schematically represented by the following Flow Sheets A, B, C and D: wherein $R_1$, $R_2$ and $R_3$ have the same significance as above; $R_4$ and $R_5$ are each a lower alkyl group, preferably having not more than five carbon atoms, or an aralkyl group, preferably benzyl, $R_4$ and $R_5$ being the same or different or $R_4$ and $R_5$ may together with the nitrogen atom form a five or six membered ring, or together with the nitrogen atom and an oxygen, nitrogen or sulphur atom form a five or six membered ring, such as pyrrolidinyl, 2-methyl pyrrolidinyl, 2,2-dimethyl pyrrolidinyl, and other alkyl substituted pyrrolidinyl rings, piperazinyl, 4-methyl piperazinyl, 2,4-dimethyl piperazinyl, and other alkyl substituted piperazinyl rings, morpholinyl, piperidinyl, 2-methyl piperidinyl, 3-methyl piperidinyl and other alkyl substituted piperidinyl rings, hexamethyleniminyl, homopiperazinyl, homomorpholinyl rings, imidazolidinyl, oxazolidinyl rings, and the unsaturated and nuclearly substituted derivatives thereof; and Z is a lower alkyl or haloalkyl group, preferably having not more than five carbon atoms, or an alkenyl, haloalkenyl, alkynyl, or haloalkynyl group, preferably having not more than three carbon atoms.

FLOW SHEET A

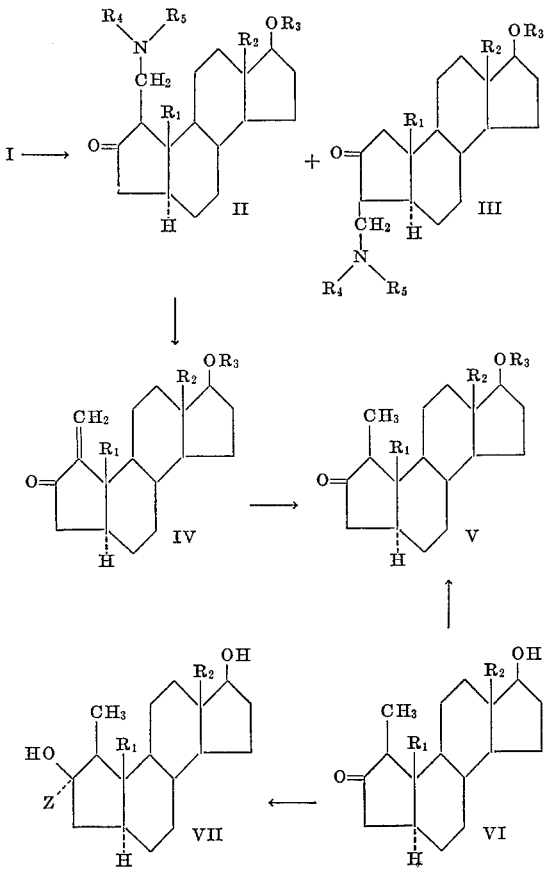

FLOW SHEET B

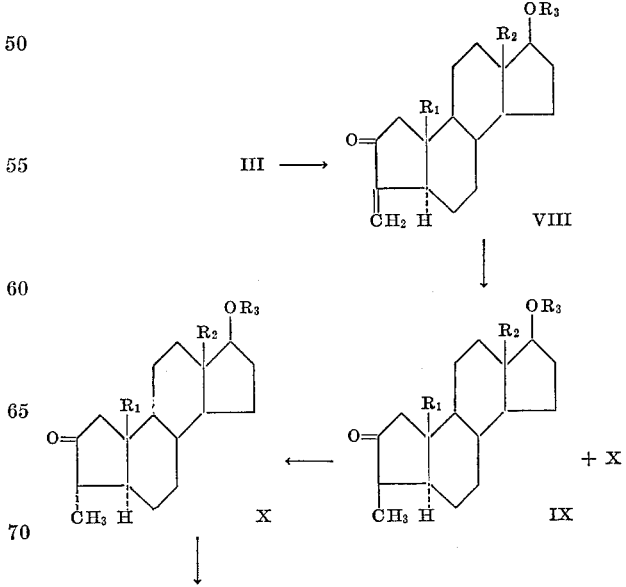

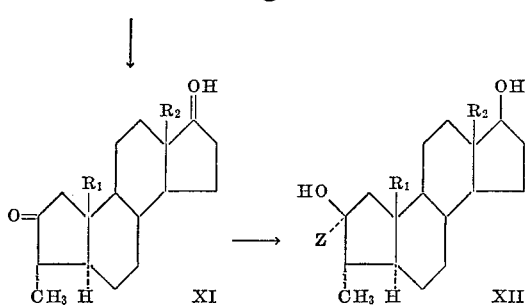

FLOW SHEET C

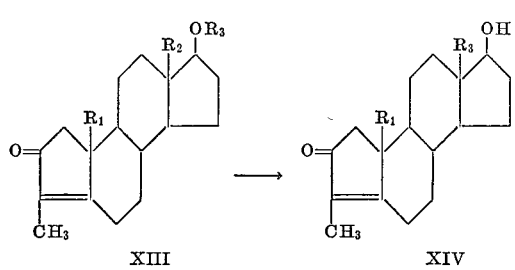

FLOW SHEET D

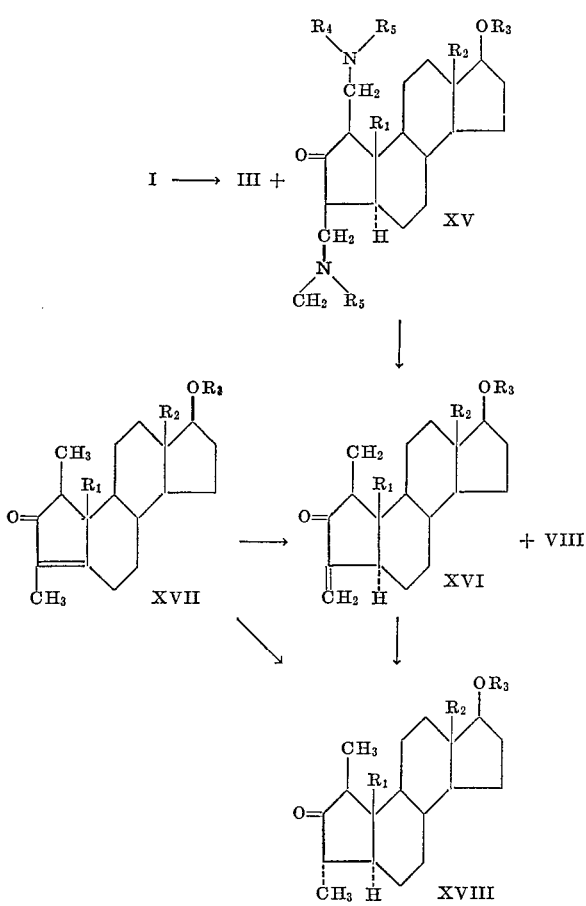

The first step in the process of Flow Sheet A is the preparation of the 1- and 3-Mannich bases of 1- and 3-methyl - 10 - hydrogen or methyl - 13 - lower alkyl - 17β-acyloxy-A-nor-5α-gonan-2-one steroids. In this step, an acidified suspension in a suitable solvent, such as nitromethane, of Compound I, formaldehyde or a formaldehyde generating compound, and a salt of a compound having a secondary nitrogen atom is heated. In the preferred modification of the first-step reaction, a suspension in nitromethane, which is acidified with concentrated hydrochloric acid, of Compound I, trioxymethylene and a salt, preferably a hydrochloride, of a compound having a secondary nitrogen atom of the formula:

wherein $R_4$ and $R_5$ have the same significance as above, is heated at a temperature of about 30° to 100° C. During the heating period, the suspension quickly becomes homogenous and heating is continued for about 1½ to 5 hours. The nitromethane is removed as completely as possible by distillation under reduced pressure and water is added to the residue. The insoluble material is removed by filtration and washed with water and the wash water is added to the aqueous filtrate. The aqueous filtrate is made alkaline with ammonia, extracted with ether, dried over anhydrous magnesium sulfate, and the solvent is removed by distillation under reduced pressure. A crystalline material is obtained from the residue by trituration with ether and filtration. The crystalline material, which is a Mannich base, more particularly, a 3-X-10-hydrogen or methyl-13-lower alkyl-17β-acyloxy-A-nor-5α-gonan-2-one in which X is:

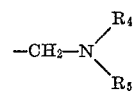

wherein $R_4$ and $R_5$ have the same significance as above (Compound III), may be recrystallized from a suitable solvent, such as propanol. The solvent is removed from the filtrate and the residue is taken up in hot hexane, and filtered. Upon cooling, a crystalline Mannich base, more particularly, a 1-X-10-hydrogen or methyl-13-lower alkyl-17β-acyloxy-A-nor-5α-gonan-2-one in which X has the same significance as above (Compound II) is formed and removed by filtration.

Compound II, obtained in the first-step reaction, is used in the second step of the process of Flow Sheet A for the preparation of the novel 1-methylene-10-hydrogen or methyl-13-lower alkyl-17β-acyloxy-A-nor-5α-gonan-2-one, 1β-methyl-10-hydrogen or methyl-13-lower alkyl-17β-hydroxy or acyloxy-A-nor-5α-gonan-2-one and 1β-methyl-2β,17β-dihydroxy-2α-alkyl, alkenyl and alkynyl-10-hydrogen or methyl-13-lower alkyl-A-nor-5α-gonane steroids.

In the second step, a solution of Compound II in acetic acid containing acetic anhydride is heated at a temperature of from about 30° to 100° C. for about two to eight hours. The reaction product, 1-methylene-10-hydrogen or methyl-13-lower alkyl-17β-acyloxy-A-nor-5α-gonan-2-one (Compound IV), may be conveniently isolated from the reaction mixture by adding water. Compound IV crystallizes from the aqueous mixture upon standing and is removed by filtration and purified by recrystallization from a suitable solvent, such as aqueous methanol.

In the third reaction step, a solution of Compound IV in ethanol containing a palladium on charcoal catalyst is shaken with hydrogen until the theoretical amount is taken up. The reaction mixture is filtered to remove the catalyst and the solvent is removed by distillation under reduced pressure. The residue is 1β-methyl-10-hydrogen or methyl-13-lower alkyl-17β-acyloxy-A-nor-5α-gonan-2-one (Compound V) and may be purified by recrystallization from a suitable solvent, such as an ethanol-water solution.

In the fourth step, the 17β-acyloxy group of Compound V is saponified by refluxing a solution of Compound V in ethanol containing sodium ethanolate for about 30 minutes. The saponification product, 1β-methyl-10-hydrogen or methyl-13-lower alkyl-17β-hydroxy-A-nor-5α-gonan-2-one (Compound VI), is conveniently isolated by cooling the reaction mixture to room temperature, neutralizing with dilute aqueous hydrochloric acid, removing the water and ethanol by distillation under reduced pressure, adding water in an amount sufficient to dissolve the inorganic salt and filtering. The crystalline material is Compound VI and may be purified by recrystallization from a suitable solvent, such as an ethanol-water solution.

In the fifth step, a solution of Compound VI in a suitable solvent, such as tetrahydrofuran, is added to a solution of alkyl, alkenyl or alkynyl magnesium bromide in a suitable solvent, such as tetrahydrofuran. After addition is complete, the reaction mixture is refluxed for about 2½ hours. The reaction product, 1β-methyl-2β,17β-dihydroxy-2α-alkyl, alkenyl or alkynyl-10-hydrogen or methyl-13-lower alkyl-A-nor-5α-gonane (Compound VII) may be conveniently isolated by cooling the reaction mixture and adding a saturated aqueous solution of ammonium chloride, separating the aqueous layer from the organic layer and removing the solvents from the organic layer by distillation under reduced pressure. The residue is Compound VII and may be purified by crystallization from a suitable solvent, such as a methanol-water solution.

Compound III, obtained in the first-step reaction of the process of Flow Sheet A, is the starting material for the preparation according to the process of Flow Sheet B of the novel 3-methylene-, 3β-methyl- and 3α-methyl-10-hydrogen or methyl-13-lower alkyl-17β-hydroxy or acyloxy-A-nor-5α-gonan-2-one steroids and the 3α-methyl-2β,17β-dihydroxy-2α-alkyl, alkenyl or alkynyl-10-hydrogen or methyl-13-lower alkyl-A-nor-55α-gonane steroids.

In the first step of the process of Flow Sheet B, a solution of Compound III in acetic acid containing acetic anhydride is heated at a temperature of from about 30° to 100° C. for about two to eight hours. The reaction product, 3-methylene-10-hydrogen or methyl-13-lower alkyl-17β-acyloxy-A-nor-5α-gonan-2-one (Compound VIII), may be isolated from the reaction mixture by adding water and removing the crystallized Compound VIII which forms. Compound VIII may be recrystallized from a suitable solvent, such as aqueous methanol.

In the second reaction step, Compound VIII is hydrogenated by the use of a nickel catalyst which is prepared by adding a 1 N aqueous solution of potassium borohydride to an aqueous solution of nickel acetate, decanting the solution from the black precipitate, rinsing the precipitate repeatedly with water and then several times with ethanol. In conducting the hydrogenation, a solution of Compound VIII in ethanol containing the catalyst in suspension is shaken with hydrogen until one molecular equivalent of hydrogen is absorbed. The reaction mixture is filtered and the solvent is removed by distillation under reduced pressure. The residue is a mixture of 3β-methyl-10-hydrogen or methyl-13-lower alkyl-17β-acyloxy-A-nor-5α-gonan-2-one (Compound IX) and 3α-methyl-10-hydrogen or methyl-13-lower alkyl-17β-acyloxy-A-nor-5α-gonan-2-one (Compound X). Compounds IX and X may be separated by chromatography, for example, by taking the residue up in a solution comprising about 20% by volume of ethyl acetate and about 80% by volume of hexane, and passing the solution through a column of silica gel, followed by developing the column with a suitable solvent and isolation of Compounds IX and X from the column.

In the third step, Compound IX is isomerized to Compound X. The residue from the second reaction step before chromatographic separation may also be used in the third reaction step. Isomerization is accomplished by allowing a solution of Compound IX or the residue obtained from the second reaction step in acetic acid containing about 10% by volume of hydrobromic acid to stand at room temperature for about 3 hours. Compound X may be conveniently recovered from the reaction mixture by adding sufficient water to precipitate the steroid and filtering to recover Compound X which crystallizes following the addition of water. Compound X may be purified by recrystallization from a suitable solvent, such as hexane or an aqueous ethanol solution.

In the fourth step, the 17β-acryloxy group of Compound X is saponified by refluxing a solution of Compound X in ethanol containing sodium ethanolate for about 30 minutes. The saponification product, 3α-methyl-10-hydrogen or methyl-13-lower alkyl - 17β - hydroxy-A-nor-5α-gonan-2-one (Compound XI), is conveniently isolated by cooling the reaction mixture to room temperature, neutralizing with dilute aqueous hydrochloric acid, removing the water and ethanol by distillation under reduced pressure, adding water in an amount sufficient to dissolve the inorganic salts and filtering. The crystalline material which forms is Compound XI and may be purified by recrystallization from a suitable solvent, such as a methanol-water solution.

In the fifth step, a solution of Compound XI in a suitable solvent, such as tetrahydrofuran, is added to a solution of an alkyl, alkenyl or alkynyl magnesium bromide in a suitable solvent, such as tetrahydrofuran. After addition is complete, the reaction mixture is refluxed for about 2½ hours. The reaction product, a 3α-methyl-2β,17β-dihydroxy-2α-alkyl, alkenyl or alkynyl - 10 - hydrogen or methyl-13-lower alkyl-A-nor - 5α - gonane (Compound XII), may be conveniently isolated by cooling the reaction mixture and adding a saturated aqueous solution of ammonium chloride, separating the aqueous layer from the organic layer, drying the organic layer and removing the solvents by distillation under reduced pressure. The residue is Compound XII and may be purified by crystallization from a suitable solvent, such as a methanol-water solution.

Compound VIII, which is obtained in the first-step reaction of the process of Flow Sheet B, is the starting material for the preparation according to Flow Sheet C of the novel 3-methyl-10-hydroyen or methyl-13-lower alkyl-17-β-hydroxy or acyloxy-A-nor-3-gonen-2-one steroids.

The first step in the process of Flow Sheet C is the rearrangement of the double bond of Compound VIII to provide 3-methyl-10-hydrogen or methyl-13-lower alkyl-17β-acyloxy-A-nor-3-gonen-2-one (Compound XIII). The conversion of Compound VIII to Compound XIII is accomplished by refluxing a solution of Compound VIII in cymene, in which a catalyst consisting of palladium on carbon is suspended, for about 1½ hours, cooling the reaction mixture to room temperature, filtering, and removing the solvent from the filtrate by distillation under reduced pressure. The residue of Compound XIII may be purified by recrystallization from a suitable solvent, such as a methanol-water solution.

In the second step, the 17β-acyloxy group of Compound XIII is saponified to provide 3-methyl-10-hydrogen or methyl-13-lower alkyl-17β-hydroxy-A-nor-3 - gonen-2-one (Compound XIV). Saponification is accomplished in the same manner as described above in connection with the saponification of Compound V. Compound XIV may be purified by recrystallization from a suitable solvent, such as an ethanol-water solution.

Compound I is the starting material for the preparation according to the process of Flow Sheet D of the novel 1,3-double Mannich base of 1,3-dimethyl-10-hydrogen or methyl-13-lower alkyl - 17β-acyloxy-A-nor - 5α-gonan-2-one; 1,3 - dimethylene - 10 - hydrogen or methyl-13-lower alkyl - 17β - acyloxy - A - nor - 5α - gonan - 2-one, 1β-methyl-3-methylene-10-hydrogen or methyl - 13-lower alkyl-17β-acyloxy-A-nor-3-gonen-2-one, 1β,3α - dimethyl-10-hydrogen or methyl-13 - lower alkyl - 17β-acyloxy-A-nor-gonan-3-one steroids.

The first step in the process of Flow Sheet D, which leads to the production of a 1,3-double Mannich base of a 1,3 - dimethyl - 10 - hydrogen or methyl - 13 - lower alkyl - 17β - acyloxy - A - nor - 5α - gonen - 2 - one steroid, is the reaction of Compound I with formaldehyde or a formaldehyde generating compound, preferably trioxymethylene, and a salt of a compound having a secondary nitrogen atom in the presence of acetic acid as a solvent and a small amount of a mineral acid, preferably concentrated hydrochloric acid. The reaction product is a mixture of Compound III and the 1,3-double Mannich base of a 1,3-dimethyl-10-hydrogen or methyl - 13 - lower alkyl - 17β - acyloxy - A-nor-5α - gonan - 2 - one (Compound XV).

In the preferred modification of the first-step reaction of the process of Flow Sheet D, a suspension in acetic acid, which is acidified with concentrated hydrochloric acid, of Compound I, trioxymethylene and a salt, preferably a hydrochloride, of a compound having a secondary nitrogen atom, of the formula:

wherein R₄ and R₅ have the same significance as above, is heated to a temperature of from about 30° to 100° C. During the heating period the suspension quickly becomes homogenous and heating is continued for about 1½ to 5 hours. The acetic acid is removed as completely as possible by distillation under reduced pressure and water is added to the residue. The insoluble material, which is unreacted starting material, is removed by filtration and washed with water. The wash-water is added to the aqueous filtrate. The aqueous filtrate is made alkaline with ammonia, extracted with ether, dried and filtered. The solvent is removed by distillation under reduced pressure. The residue is a mixture of Compounds III and XV, which may be separated by fractional crystallization from ether. It is preferred, however, that the mixture be used in the second step reaction. Compound XV may be purified by recrystallization from a suitable solvent, such as an ether-petroleum ether solvent.

In the second step, a solution of Compound XV or a solution of the mixture of Compounds III and XV obtained from the first-step reaction in acetic acid containing acetic anhydride is refluxed for about 2 to 4 hours. The reaction mixture is cooled and poured on to ice. The reaction product is recovered by extraction with a suitable organic solvent, such as chloroform. The extract is washed with aqueous sodium bicarbonate solution, washed with water, dried over anhydrous magnesium sulfate and filtered. The solvent is removed by distillation under reduced pressure. If pure Compound XV is used in the second-step reaction, the residue is 1,3-dimethylene-10-hydrogen or methyl-13-lower alkyl - 17β - acyloxy - A-nor-5α-gonan-2-one (Compound XVI) and this is purified by crystallization from a suitable solvent, such as methanol. If the mixture of Compounds III and XV obtained from the first-step reaction is used in the second-step reaction, the residue after removal of the organic solvent, is a mixture of Compounds VIII and XVI. Compounds VIII and XVI may be separated by chromatography on neutral alumina. Compound XVI which is obtained from the chromatographic procedure may be purified by recrystallization from a suitable solvent, such as methanol.

In the third step, a solution of Compound XVI in cymene and ethanol is hydrogenated by the use of palladium on carbon as a catalyst. The solution is refluxed for about one hour and then shaken in the presence of hydrogen at room temperature until one molecular equivalent of hydrogen is taken up. The hydrogenation product, 1β-methyl-3-methylene-10-hydrogen or methyl-13-lower alkyl - 17β-acyloxy-A-nor-3-gonen-2-one (Compound XVII) may be conveniently recovered from the reaction mixture by filtering to remove the catalyst and removing the solvent by distillation under reduced pressure. The residue is Compound XVII and may be purified by crystallization from a suitable solvent, such as an ethanol-water solution.

Hydrogenation of Compound XVI or XVII, in the absence of cymene but in solution in a suitable solvent, such as ethanol, and in the presence of a suitable catalyst, such as palladium on carbon, results in the production of 1β,3α-dimethyl-10-hydrogen or methyl-13-lower alkyl-17β-acetoxy-A-nor-5α-gonan-2-one (Compound XVIII), two molecular equivalents of hydrogen being required in the hydrogenation of Compound XVI, and one molecular equivalent of hydrogen being required in the hydrogenation of Compound XVII. In each instance, the solution of the compound to be hydrogenated containing the catalyst in suspension is shaken in the presence of hydrogen at room temperature until the desired amount of hydrogen is absorbed. The solution is then filtered and the solvent is removed by distillation under reduced pressure. The residue is crude Compound XVIII in each instance and may be purified by crystallization from a suitable solvent, such as methanol.

The compounds of this invention have valuable pharmacological properties. They are potent inhibitors of progesterone as demonstrated by their inhibition of the effect of progesterone on the endometrium of the rabbit.

The following examples illustrate methods of carrying out the present invention, but it is to be understood that these examples are given for purposes of illustration and not of limitation.

EXAMPLE 1

1β - morpholino methyl-17β-acetoxy-A-nor-5α-androstan-2-one and 3α-morpholino methyl-17β-acetoxy-A-nor-5α-androstan-2-one A suspension of 12 g. of 17β-acetoxy-A-nor-5α-androstan-2-one, 2 g. of morpholine hydrochloride, 1.12 g. of trioxymethylene and 12 drops of concentrated hydrochloric acid in 120 cc.'s of nitromethane are heated at 100° C. for 1½ hours. The solution quickly becomes homogenous. After the heating period, the nitromethane is removed as completely as possible by distillation under reduced pressure. The residue is taken up in water and filtered. The insoluble material is washed with water and the wash water is added to the filtrate. The aqueous solution is made alkaline with ammonia and the precipitated oil which contains some crystalline material is removed by extraction with ether. The ether extract is dried over anhydrous magnesium sulfate, filtered and substantially all the ether is removed by distillation under reduced pressure. The 1-morpholino methyl-17β-acetoxy-A-nor-5α-androstan-2-one crystallizes on standing and the volume is reduced by distilling off the ether under reduced pressure until crystals begin to form. The ether solution is allowed to stand and 1.6 g. of crystalline 3-morpholino methyl - 17β - acetoxy-A-nor-5α-androstan-2-one are obtained by filtration. The crystalline material is recrystallized from propanol and has a melting point of 184° C. After a second recrystallization from propanol, the product has a melting point of 184–185° C.

Analysis.—Calcd. for C₂₅H₃₉O₄N (417.37): C, 71.9%; H, 9.4%; N, 3.4%. Found: C, 71.7%; H, 9.6%; N, 3.6%.

The ether is removed from the mother liquor from above by distillation under reduced pressure as completely as possible and the residue is dissolved in hot hexane and filtered. The 1β-morpholino methyl-17β-acetoxy-A-nor-5α-androstan-2-one crystallizes from the cold hexane solution and, after recrystallization from hexane, the product has a melting point of 118–119° C.

Analysis.—Calcd. for C₂₅H₃₉O₄N (417.57): C, 71.9%; H, 9.4%; N, 3.4%. Found: C, 71.9%; H, 9.2%; N, 3.4%.

EXAMPLE 2

1-methylene-17β-acetoxy-A-nor-5α-androstan-2-one

A solution of 250 mg. of 1β-morpholino methyl-17β-acetoxy-A-nor-5α-androstan-2-one in 1 ml. of acetic anhydride and 1 ml. of acetic acid are heated for 2 hours at a temperature of 100° C. The solution is cooled, and water is added. The crystalline material which forms on allowing the solution to stand is 1-methylene-17β-acetoxy-A-nor-5α-androstan-2-one and has a melting point of 99–100° C. The crystalline material is recrystallized from a solution comprising equal parts by volume of water and methanol. The recrystallized material has a melting point of 115° C.

*Analysis.*—Calcd. for $C_{21}H_{30}O_3$ (330.45): C, 76.3%; H, 9.15%. Found: C, 76.0%; H, 9.3%.

EXAMPLE 3

1β-methyl-17β-acetoxy-A-nor-5α-androstan-2-one

A solution of 8.3 mg. of 1-methylene-17β-acetoxy-A-nor-5α-androstan-2-one in 15 ml. of ethanol, in which is suspended 450 mg. of a palladium on carbon catalyst, are shaken with hydrogen until one molecular equivalent of hydrogen is absorbed. The solution is filtered to remove the catalyst, and the filtrate is diluted with water. The solvent is removed by distillation under reduced pressure. The filtrate is diluted with an equal volume of water. The 1β-methyl-17β-acetoxy-A-nor-5α-androstan-2-one crystallizes from the aqueous ethanol solution on standing and has a melting point of 128° C. The product is recrystallized from aqueous ethanol and the crystallized material has a melting point of 134° C.

*Analysis.*—Calcd. for $C_{21}H_{32}O_3$ (332.45): C, 75.9%; H, 9.7%. Found: C, 76.0%; H, 9.7%.

EXAMPLE 4

1β-methyl-17β-hydroxy-A-nor-5α-androstan-2-one

A solution of 1 g. of 1β-methyl-17β-acetoxy-A-nor-5α-androstan-2-one in a 1 N solution of sodium ethanolate in ethanol is refluxed for 30 minutes. The solution is cooled to room temperature and diluted with an equal volume of water. 1β-methyl-17β-hydroxy-A-nor-5α-androstan-2-one crystallizes from the diluted solution on standing and is removed by filtration. The crystalline material has a melting point of 162° C. and, after recrystallization from aqueous ethanol and dissolvation under high vacuum at 120° C., it has a melting point of 164° C.

*Analysis.*—Calcd. for $C_{19}H_{30}O_2$ (290.43): C, 78.6%; H, 10.4%. Found: C, 78.6%; H, 10.2%.

EXAMPLE 5

1β-methyl-2α-ethinyl-2β,17β-dihydroxy-A-nor-5α-androstane

A solution of ethyl magnesium bromide, prepared from 0.25 g. of magnesium and 2 ml. of ethyl bromide in 8 ml. of tetrahydrofuran, is added slowly to a solution of acetylene in 10 cc.'s of tetrahydrofuran. After addition is complete, a solution of 200 mg. of 1β-methyl-17β-hydroxy-A-nor-5α-androstan-2-one in 5 ml. of tetrahydrofuran is added and this solution is refluxed for 2½ hours. The solution is cooled and a saturated aqueous solution of ammonium chloride is added. The aqueous layer is removed and the organic layer is washed with water, dried over anhydrous magnesium sulfate and filtered. The solvent is removed by distillation under reduced pressure. The residue is 1β-methyl-2α-ethinyl-2β,17β-dihydroxy-A-nor-5α-androstane and is recrystallized from aqueous methanol. The recrystallized material has a melting point of 190° C.

*Analysis.*—Calcd. for $C_{21}H_{32}O_2$ (316.47): C, 79.7%; H, 10.2%. Found: C, 79.65%; H, 10.1%.

EXAMPLE 6

1β,2α-dimethyl-2α,17β-dihydroxy-A-nor-5α-androstane

A solution of 0.15 g. of 1β-methyl-17β-hydroxy-A-nor-5α-androstan-2-one in 10 ml. of ether and 5 ml. of tetrahydrofuran are added to a solution of methyl magnesium bromide, prepared from 0.12 g. of magnesium, 0.5 ml. of methyl iodide and 5 ml. of ether. The resulting solution is refluxed for 2½ hours. The solution is cooled and saturated aqueous ammonium chloride solution is added. The aqueous layer is separated from the organic layer. The organic layer is washed with water, dried over anhydrous magnesium sulfate and filtered. The solvent is removed from the organic layer by distillation under reduced pressure. The residue of 1β,2α-dimethyl-2α,17β-dihydroxy-A-nor-5α-androstane is crystallized from ethyl acetate. The crystalline material has a melting point of 162° C.

*Analysis.*—Calcd. for $C_{20}H_{34}O_2$ (306.47): C, 78.4%; H, 11.2%. Found: C, 78.2%; H, 11.45%.

EXAMPLE 7

3-methylene-17β-acetoxy-A-nor-5α-androstan-2-one

A solution of 160 mg. of 3α-morpholino methyl-17β-acetoxy-A-nor-5α-androstan-2-one in 1 ml. of acetic anhydride and 1 ml. of acetic acid are heated at 100° C. for 1 hour. The solution is cooled and 5 ml. of water are added. The aqueous solution is allowed to stand until crystallization is complete, and filtered. 112 milligrams of 3 - methylene - 17β - acetoxy-A-nor-5α-androstan-2-one are obtained which have a melting point of 114–115° C.

*Analysis.*—Calcd. for $C_{21}H_{30}O_3$ (330.45): C, 76.3%; H, 9.15%. Found: C, 76.45%; H, 8.9%.

EXAMPLE 8

3α-methyl-17β-acetoxy-A-nor-5α-androstan-2-one and 3β-methyl-17β-acetoxy-A-nor-5α-androstan-2-one A solution of 1.4 g. of 3-methylene-17β-acetoxy-A-nor-5α-androstan-2-one in 40 ml. of ethanol, in which is suspended a catalyst prepared by adding 21 ml. of a normal solution of potassium borohydride to a solution of 1.75 g. of nickel acetate in 70 ml. of water, decanting the liquid from the black precipitate and washing the precipitate 3 times with water and then 3 times with alcohol, shaken with hydrogen until 1 molecular equivalent of hydrogen is absorbed. The solution is filtered and the solvent is removed from the filtrate by distillation under reduced pressure. A solution of the residue in a solvent consisting of 20% by volume of ethyl acetate and 80% by volume of hexane is put on a column of silica gel. The column is developed with the same solvent. The 3β-methyl-17β-acetoxy-A-nor-5α-androstan-2-one recovered from the column has a melting point of 130° C.

*Analysis.*—Calcd. for $C_{21}H_{32}O_3$ (332.45): C, 75.9%; H, 9.7%. Found: C, 75.4%; H, 9.35%.

EXAMPLE 9

3α-methyl-17β-acetoxy-A-nor-5α-androstan-2-one

A solution of 1.4 g. of the crude hydrogenation mixture of 3α - methyl-17β-acetoxy - A - nor-5α-androstan-2-one and 3β-methyl-17β-acetoxy - A - nor-5α-androstan-2-one obtained according to Example 8 in 10 ml. of acetic acid containing 10% by weight of hydrobromic acid, is allowed to stand for 3 hours at room temperature. An equal volume of water is then added to the reaction mixture and the crystalline material which forms on standing is removed by filtration. The crystalline material is 3α-methyl-17β-acetoxy-A-nor-5α-androstan-2-one, and has a melting point of 124° C.

*Analysis.*—Calcd. for $C_{21}H_{32}O_3$ (332.45): C, 75.9%; H, 9.7%. Found: C, 75.7%; H, 9.5%.

EXAMPLE 10

3α-methyl-17β-hydroxy-A-nor-5α-androstan-2-one

A solution of 385 mg. of 3α-methyl-17β-acetoxy-A-nor-5α-androstan-2-one in 10 ml. of ethanol containing 0.5 ml. of 10 N sodium hydroxide are refluxed for 30 minutes and then cooled to room temperature. An equal volume of water is added to the cooled solution and the crystalline 3α - methyl-17β-hydroxy-A-nor-5α-androstan-2-one which forms is removed by filtration. 277 milligrams of crystalline material are obtained and recrystallized from aqueous methanol. The melting point of the recrystallized material is 154° C.

*Analysis.*—Calcd. for $C_{19}H_{30}O_2$ (290.43): C, 78.6%; H, 10.4%. Found: C, 78.5%; H, 10.2%.

EXAMPLE 11

3α-methyl-2α-ethinyl-2β,17β-dihydroxy-A-nor-5α-androstane

A solution of ethyl magnesium bromide, prepared from 0.4 g. of magnesium and 3.2 ml. of ethyl bromide in 13 ml. of tetrahydrofuran, is added slowly to a solution of acetylene in 15 ml. of tetrahydrofuran. After addition is complete, a solution of 360 mg. of 1β-methyl-17β-hydroxy-A-nor-5α-androstan-2-one in 5 ml. of tetrahydrofuran is added and this solution is refluxed for 3½ hours. The solution is cooled and a saturated aqueous solution of ammonium chloride is added. The aqueous layer is removed and the organic layer is extracted with ether, and the ether extract is dried over anhydrous magnesium sulfate and filtered. The solvent is removed from the extract by distillation under reduced pressure. A solution of the residue is placed on a column of alumina, 1β-methyl-2α-ethinyl-2β,17β-dihydroxy-A-nor - 5α - androstane is eluted from the column with a solvent which consists of 30% by volume of ether and 50% by volume of benzene. The solvent is removed by distillation under reduced pressure and the residue is recrystallized from an ethyl acetate-hexane solvent. The recrystallized material has a melting point of 174° C.

Analysis.—Calcd. for $C_{21}H_{32}O_2$ (316.47): C, 79.7%; H, 10.2%. Found: C, 79.4%; H, 9.8%.

EXAMPLE 12

3-methyl-17β-acetoxy-A-norandrost-3-en-2-one

A solution of 100 mg. of 3-methylene-17β-acetoxy-A-nor-5α-androstan-2-one in 6 ml. of cymene in which are suspended 100 mg. of a palladium on carbon catalyst containing 5% palladium are brought to reflux over a period of 1½ hours. The solution is cooled, filtered and the catalyst is washed with ether. The ether is added to the filtrate and the solvent is removed from this solution by distillation under reduced pressure. The residue is 3-methyl-17β-acetoxy-A-norandrost-3-en-2-one and is purified by crystallization from aqueous methanol. The crystallized material has a melting point of 135° C.

Analysis.—Calcd. for $C_{21}H_{30}O_3$ (330.45): C, 76.3%; H, 9.15%. Found: C, 76.0%; H, 8.85%.

EXAMPLE 13

3-methyl-17β-hydroxy-A-norandrost-3-en-2-one

A solution of 100 mg. of 3-methyl-17β-acetoxy-A-norandrost-3-en-2-one in 8 ml. of methanol which contains 2 ml. of 10 N sodium hydroxide are refluxed for 30 minutes and then cooled. An equal volume of water is added to the cooled solution and the crystalline material which forms on standing is removed by filtration. The crystalline material is 3-methyl-17β-hydroxy-A-norandrost-3-en-2-one and is purified by recrystallization from aqueous methanol. The recrystallized material has a melting point of 143° C.

Analysis.—Calcd. for $C_{19}H_{28}O_2$ (288.41): C, 79.1%; H, 9.8%. Found: C, 78.9%; H, 9.6%.

EXAMPLE 14

1,3-bis-morpholinomethyl-17β-acetoxy-A-nor - 5α - androstan-2-one and 3α-morpholinomethyl - 17β - acetoxy-A-nor-5α-androstan-2-one A suspension of 12 g. of 17β-acetoxy-A-nor-5α-androstan-2-one, 2 g. of morpholine hydrochloride, 1.12 g. of trioxymethylene and 12 drops of concentrated hydrochloric acid in 120 ml. of ethanol are heated at 100° C. for 1½ hours. The solution quickly becomes homogenous. After the heating period, the ethanol is removed as completely as possible by distillation under reduced pressure. The residue is taken up in water and filtered. The insoluble material is washed with water and the wash water is added to the filtrate. The aqueous solution is made alkaline with ammonia and the alkaline solution is extracted 3 times with 50 ml. portions of ether. The ether extracts are combined, dried over anhydrous magnesium sulfate, filtered and ether is removed from the solution by distillation under reduced pressure until crystals appear. The crystalline material is 3α-morpholino methyl-17β-acetoxy-A-nor-5α-androstan-2-one and is removed by filtration. The residue is fractionally crystallized from ether until substantially all of the 3α-morpholino methyl-17β-acetoxy-A-nor-5α-androstan-2-one is removed from the mixture. The ether is removed from the residue by distillation under reduced pressure and the residue, which is substantially 1,3-bis-morpholinomethyl - 17β - acetoxy - A-nor-5α-androstan-2-one, is purified by recrystallization from an ether-petroleum ether solvent.

EXAMPLE 15

1,3 - bis-methylene-17β-acetoxy-A-nor-5α-androstan-2-one

A solution of 300 mg. of 1,3-bis-morpholinomethyl-17β-acetoxy-A-nor-5α-androstan-2-one in 1.5 ml. of acetic acid and 1.5 ml. of acetic anhydride is refluxed for 3 hours. The reaction mixture is cooled and poured onto ice, and the aqueous solution is extracted 3 times with 10 ml. portions of chloroform. The chloroform extracts are combined, washed with aqueous sodium bicarbonate solution, washed with water, dried over anhydrous magnesium sulfate and filtered. The solvent is removed from the filtrate by distillation under reduced pressure. The residue is 1,3 - bismethylene-17β-acetoxy-A-nor-5α-androstan-2-one and is purified by crystallization from methanol.

EXAMPLE 16

1,3-bis-methylene-17β-acetoxy-A-nor-5α-androstan-2-one and 3-methylene-17β-acetoxy-A-nor-5α-androstan-2-one A solution of 2 g. of the crude mixture of 1,3-bis-morpholinomethyl-17β-acetoxy-A-nor-5α - androstan - 2-one and 3α-morpholinomethyl-17β-acetoxy-A-nor-5α-androstan-2-one in 20 ml. of acetic anhydride and 20 ml. of acetic acid are refluxed for 3 hours. The reaction mixture is cooled and poured onto ice and the aqueous solution is extracted 3 times with 25 ml. portions of chloroform. The chloroform extracts are combined, washed with aqueous sodium bicarbonate solution, washed with water, dried over anhydrous magnesium sulfate, and filtered. The solvent is removed from the filtrate by distillation under reduced pressure. The residue is a mixture of 1,3-bis-methylene - 17β - acetoxy-A-nor-5α-androstan-2-one and 3-methylene-17β - acetoxy-A-nor - 5α-androstan - 2-one. The two reaction products are separated by chromatography on a 60 g. column of neutral alumina. A concentrated chloroform-benzene solution of the crude mixture is poured onto the column. The column is eluted first with benzene and with benzene containing 5% by volume of ether. This eluate contains the 3-methylene-17β-acetoxy-A-nor-5α-androstan - 2-one. The column is then eluted with a solvent composed of 80% ether and 20% benzene by volume and then with ether and finally with ether containing 10% by volume of ethyl acetate. These eluates are combined and the solvent is removed by distillation under reduced pressure. The residue is 1,3-bis-methylene-17β-acetoxy-A-nor-5α-androstan-2-one and is purified by crystallization from methanol.

EXAMPLE 17

1β,3-dimethyl-17β-acetoxy-A-norandrost-3-en-2-one

A solution of 200 mg. of 1,3-bis-methylene-17β-acetoxy-A-nor-5α-androstan-2-one in 5 ml. of ethanol and 5 ml. of cymene containing in suspension 50 mg. of 5% palladium on charcoal catalyst is refluxed for 1 hour. The solution is cooled to room temperature and 50 mg. of 5% palladium on charcoal catalyst is added. This solution containing suspended catalyst is shaken in the presence of hydrogen until one molecular equivalent of hydrogen is absorbed. The reaction mixture is then filtered and the solvent is removed from the filtrate by distillation under reduced pressure. The residue is 1β,3-dimethyl-17β-acetoxy-A-norandrost - 3 - en-2 - one and is purified by crystallization from methanol.

EXAMPLE 18

1β,3α-dimethyl-17β-acetoxy-A-norandrostan-2-one

A solution of 200 mg. of 1,3-bis-methylene-17β-acetoxy-A-nor-5α-androstan-2-one in 10 ml. of ethanol containing 50 mg. of a 5% palladium on charcoal catalyst in suspension is shaken with hydrogen at room temperature until 2 molecular equivalents of hydrogen are absorbed. The solution is filtered and the solvent is removed from the filtrate by distillation under reduced pressure. The residue is 1β,3α-dimethyl-17β-acetoxy-A-norandrostan-2-one and is purified by crystallization from methanol.

EXAMPLE 19

1β,3-dimethyl-17β-acetoxy-A-norandrostan-2-one

A solution of 200 mg. of 1β,3-dimethyl-17β-acetoxy-A-norandrost-3-en-2-one in 10 ml. of ethanol containing 50 mg. of 5% palladium on charcoal catalyst in suspension is shaken in the presence of hydrogen at room temperature until 1 molecular equivalent of hydrogen is absorbed. The solution is filtered and the solvent is removed from the filtrate by distillation under reduced pressure. The residue is 1β,3α-dimethyl-17β-acetoxy-A-norandrostan-2-one and is purified by crystallization from methanol.

Various changes and modifications may be made in carrying out the present invention without departing from the spirit and scope thereof. Insofar as these changes and modifications are within the purview of the annexed claim, they are to be considered as part of our invention.

What is claimed is:

1. A compound selected from the class consisting of compounds of the formulas:

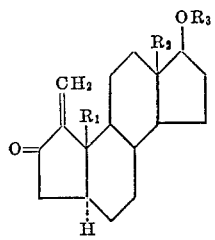

and

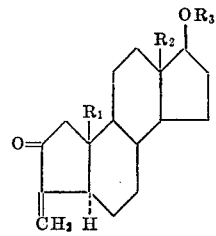

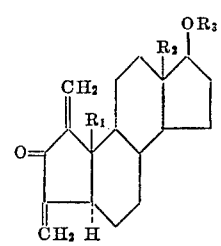

wherein $R_1$ is hydrogen or a methyl group, $R_2$ is a lower alkyl group, and $R_3$ is hydrogen or a lower alkanoyl group.

References Cited

UNITED STATES PATENTS

| | | | |
|---|---|---|---|
| 3,202,686 | 8/1965 | Hughes et al. | 260—586 |
| 3,210,406 | 10/1965 | Weisenborn | 260—586 |
| 3,178,411 | 4/1965 | Beal et al. | 260—239.5 |

OTHER REFERENCES

Adams et al.: Org. Reactions, p. 418.

LORRAINE A. WEINBERGER, *Primary Examiner.*

V. GARNER, *Assistant Examiner.*

U.S. Cl. X.R.

260—243, 247.2, 247.7, 246, 326.8, 294.3, 294.7, 268, 307, 309.7, 617, 586, 999